(12) United States Patent
Morcillo Martinez

(10) Patent No.: US 6,577,965 B1
(45) Date of Patent: Jun. 10, 2003

(54) LINEAR MULTICHANNEL DETECTION SYSTEM FOR BILLING BY SPECTRUM CONVOLUTION

(75) Inventor: Antonio Javier Morcillo Martinez, Madrid (ES)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/482,637

(22) Filed: Jan. 14, 2000

(30) Foreign Application Priority Data

Jan. 28, 1999 (ES) .............................................. 9900175

(51) Int. Cl.[7] .......................... G01R 23/16; H04M 15/00
(52) U.S. Cl. .................. 702/76; 702/189; 379/114.07; 379/114.08; 379/130; 455/465
(58) Field of Search ...................... 702/60–62, 75–79, 702/106, 122, 124, 127, 183, 189–194, 198; 379/111, 114.07, 114.08, 130, 341; 455/407, 406, 405, 403; 708/1, 5, 7, 300, 303, 315, 316

(56) References Cited

U.S. PATENT DOCUMENTS

| | | | | |
|---|---|---|---|---|
| 4,164,036 A | * | 8/1979 | Wax ............................. | 702/74 |
| 4,638,122 A | * | 1/1987 | Siligoni et al. ............. | 379/124 |
| 5,311,544 A | * | 5/1994 | Park et al. ................... | 375/152 |
| 5,452,345 A | * | 9/1995 | Zhou et al. .................. | 379/124 |
| 6,356,547 B1 | * | 3/2002 | Valentine et al. ........... | 370/360 |

\* cited by examiner

*Primary Examiner*—Marc S. Hoff
*Assistant Examiner*—Manuel L. Barbee
(74) *Attorney, Agent, or Firm*—Sughrue Mion, PLLC

(57) ABSTRACT

A linear multichannel detection system for billing by spectrum convolution applicable in telecommunications systems, capable of detecting the metering pulses in a signal sent from a telephone exchange to the subscribers, multiplying the signal by a specific signal generated by the system and measuring powers corresponding to the signals resulting from the multiplication, in such a way that a power measured with a value greater than a predefined threshold value indicates detection of the pulse. The invention likewise refers to an access system including the detection system.

19 Claims, 3 Drawing Sheets

LINEAR MULTICHANNEL DETECTION SYSTEM FOR BILLING BY SPECTRUM CONVOLUTION

The present invention relates to a linear multichannel detection system for billing by spectrum convolution applicable in telecommunications systems. More specifically, the invention relates to a system capable of detecting metering pulses in a signal sent from a telephone exchange to the subscribers, multiplying said signal by a specific signal generated by said system.

BACKGROUND OF THE INVENTION

In developing present day telecommunications systems, when implementing systems for connecting to typical telephone exchanges, for example of the type referred to as POTS or "Plain Old Telephone Service", the problem arises of detecting billing signals, more commonly referred to as "metering". These signals are transmitted by the telephone exchange to the subscriber line, and carry information typically related to financial charges to be paid by the subscriber, for the provision of the telephone service.

These signals take the form of pulses that are usually at high frequency, i.e. between 12 and 16 kHz, transmitted transversally across the two wires of the telephone line. The billing function has to be implemented on a basis of detecting these pulses on the subscriber side.

These pulses, however, can appear at any moment in the communication, for example during the telephone conversation. This means that the detector employed for detecting said pulses must be capable of perfectly suppressing the audio band in order to be able to discriminate the signal to be detected. Likewise, high frequency noise, for example at 20 to 60 kHz and having an amplitude of several volts, can be present on the line, despite which the pulse detecting system has to detect these and only these pulses, said pulses having typically an amplitude of a few times ten millivolts.

These severe detection requirements, translate in practice into really tight discrimination specifications which are published for each country in bodies like the ETSI, and which, in a word, lead to the requirement for using linear bandpass 2 to 10-order filters, depending on the country, for each subscriber line.

The current solutions are based on implementing these filters, subscriber by subscriber. The technologies employed are normally the following:

1. Passive filters, comprising standard L-C networks with inductor setting by adjustable air gap.
2. Active filters, comprising R-C/Operational Amplifier networks, with setting by potentiometer.
3. Active ceramic filters with precision resistors trimmed by LASER.
4. Switched capacitor filters, with precision resistors and ceramic substrate.

A drawback of this type of solution is that to implement a high order filter, for example up to 10, for each subscriber, a complex production system has consequently to be set up. For example, in the case of using passive components, it is necessary 5 inductors and 5 capacitors, with a manual procedure for inductor setting. If this solution is employed with interface boards in a system which is connected to a telephone exchange, and which provides service for a significant number of subscribers, for example up to 1024 subscribers, this solution can imply a high cost in:

1. Components: 5 inductors and 5 capacitors, precision type, 0.67%.
2. Component setting: manual setting of inductors, potentiometers, or ceramic resistors, with LASER.
3. Space on the printed circuit board.
4. Hardware inflexibility in the event of changes in specification among different countries, which at times can require a different detection mask.

Consequently it has become necessary to provide a system in which the detection of metering pulses is achieved in a more economical and less complex fashion.

SUMMARY OF THE INVENTION

The present invention proposes a system for detecting at least one given frequency within a received signal, said given frequency belonging to a particular frequency band, which is characterised in that it comprises means for generating at least one specific signal, the spectrum of which corresponds to said particular frequency band; means for multiplying said received signal by said at least one specific signal; and means for measuring the corresponding powers of the signals resulting from said multiplication, so that a measured power greater than a threshold value, indicates that said given frequency has been detected.

According to a preferred embodiment of the invention, the system is characterised in that the specific signal is broken down by analysis into two signals, these being the in-phase and quadrature components of the specific signal having the same spectrum as the latter, for the purpose of performing amplitude detection of the incoming signal, independently of its phase.

According to another preferred embodiment of the invention, the system is characterised in that said means for generating at least one specific signal comprises a digital unit for signal spectrum encoding capable of generating digital signals.

According to another preferred embodiment of the invention, the system is characterised in that said digital signals contain spectral specifications of the network to which the subscriber is connected, in the form of digital encoding of a mask for detection and rejection of frequency levels.

According to another preferred embodiment of the invention, the system is characterised in that the signal resulting from the multiplication is applied to a filter, preferably low-pass, the output from which is squared for providing an estimate of the power spectral density of the specific signal, scaled in proportion to the amplitude of the signal received, so that said spectrum behaves substantially the same as the desired detection mask.

Likewise, the present invention proposes an access system incorporating the detection system of the invention.

The solution proposed by the invention drastically reduces the costs mentioned above since it significantly reduces the space occupied on the printed circuit board; it does not require any manual setting process of components since the boards can be produced with a perfectly valid detection mask; it does not therefore require precision technology, or a high cost as in the case of filters developed on a ceramic substrate, with LASER-trimmed precision resistors. In addition, the change from one detection mask to another due to the different specifications of each country, proves very straightforward for an expert in the matter as it would be a question of changing the programming in a memory device (for example, an EPROM), common for all subscribers to the system.

These and other features of the invention are described below with the assistance of the attached figures.

PREFERRED EMBODIMENT OF THE INVENTION

As already mentioned, the problem to be overcome according to the invention is to detect the presence of a pulse defined in the following terms:

pulse frequency, $f_p$, which can vary between a minimum $f_{min}$ and a maximum $f_{max}$, but during the time for which the pulse lasts it is fixed.

pulse duration time, the minimum value of which, $T_{min}$, is defined, being in the order of 50 ms.

rejection mask that defines, outside the detection band (from $f_{min}$, to $f_{max}$), the signal levels that can be sent to the detector, and which have to be rejected by the latter in order to avoid their detection.

In the case described here, it has been assumed that the pulse has a square shape in time, which constitutes the worst case in practice, since pulses with gradual rising and falling edges have cleaner spectra, and consequently are easier to detect selectively.

Figure 1:
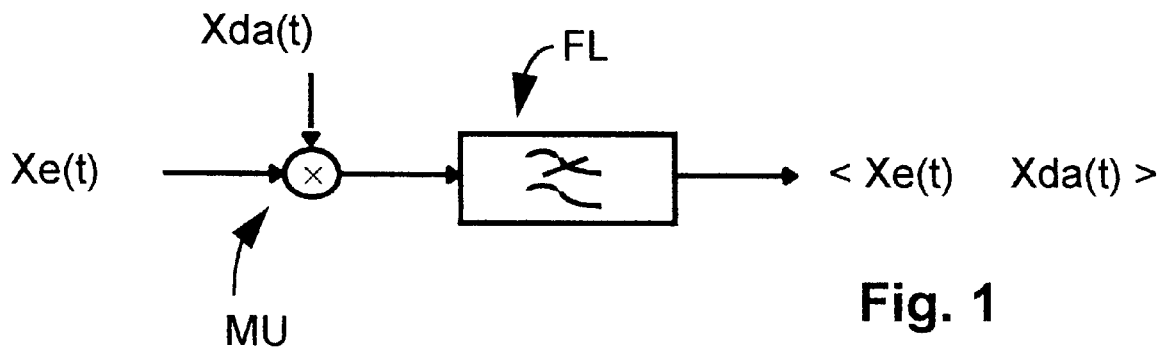
FIG. 1 is a schematic representation of a simple circuit for carrying out the multiplication and filtering proposed by the invention.
Figure 2:
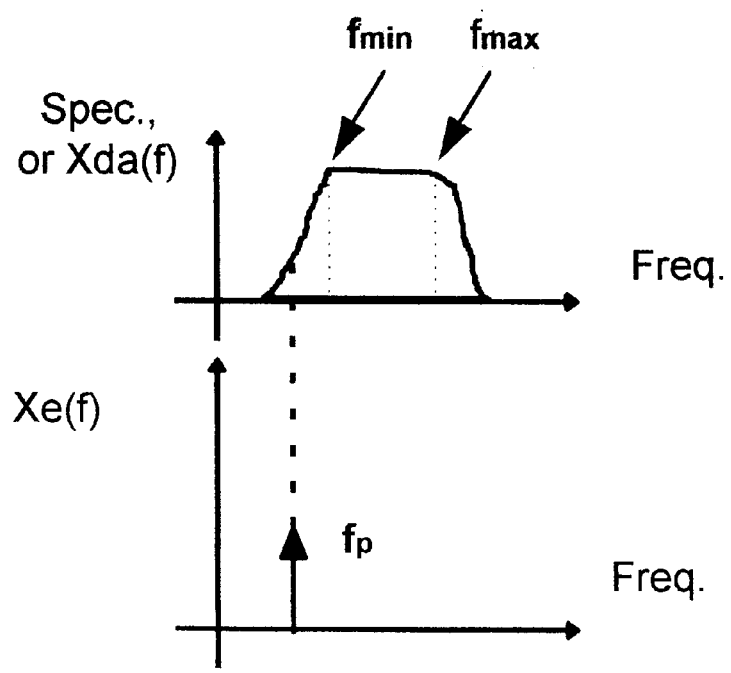
FIG. 2 is a diagram comparing a detection mask and a metering pulse signal both as a function of frequency.

With reference to FIGS. 1 and 2, it can be seen that for detecting a pulse that can be in the form of a sinusoidal signal, Xe, with a given detection mask, a signal Xda is generated, the spectrum of which is identical to the desired detection mask. Next, both signals are multiplied in the time domain in a multiplier means, MU, and the result is filtered using a very selective low-pass filter, FL, with cut-off frequencies of approximately 1 Hz.

Thus, by multiplying in the time domain, the Xda spectrum, i.e. the mask to be detected, is shifted in frequency to the frequency origin, exactly at the point where the frequency of the signal to be detected is located, this being the frequency of Xe. FIG. 2 shows, comparatively, the situation of the specification of the detection mask in the upper part of the figure and which can correspond to a specific country, or to a power spectrum of the signal Xda(t), while in the lower part of said figure is shown the incoming pulse signal that is the signal to be detected, represented in this case as a Dirac delta function at its frequency.

It is to be noted that the output of the low-pass filter FL, when squared, offers an estimate of the power spectral density of the signal Xda, scaled in proportion to the amplitude of Xe, and, consequently, it will behave exactly like the desired detection mask.

Figure 3:
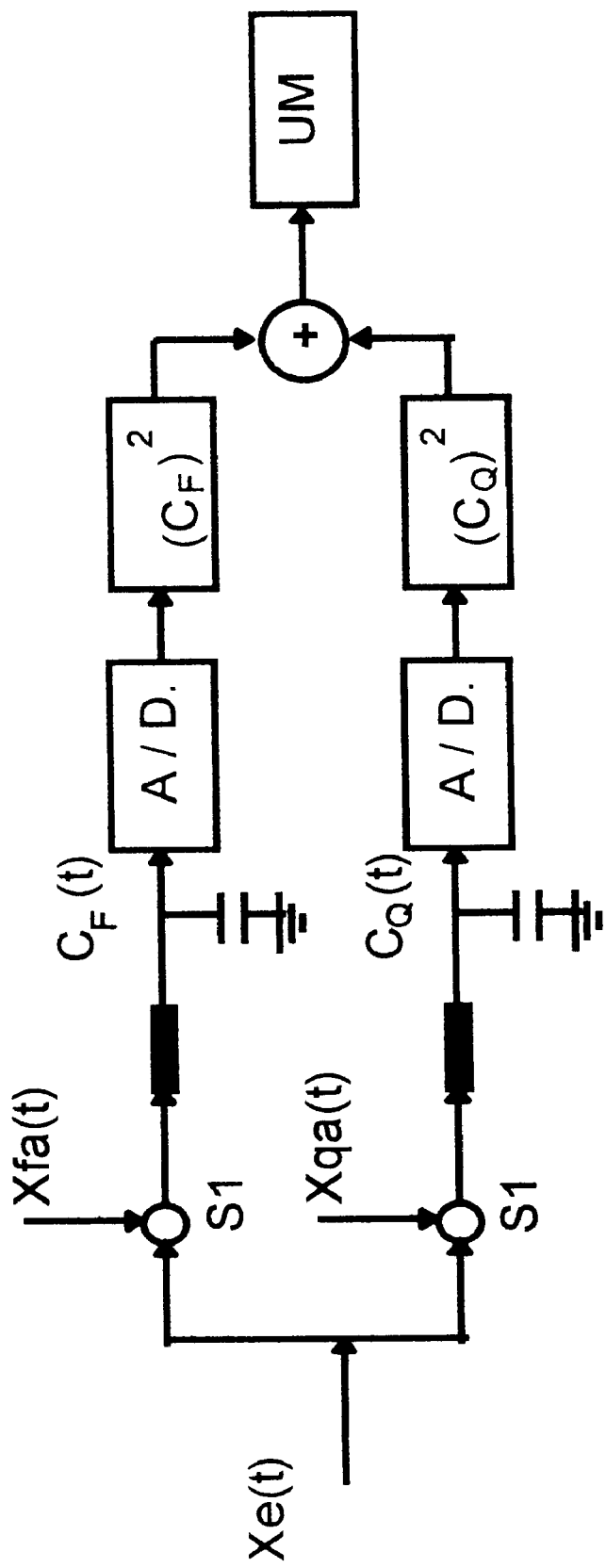
FIG. 3 is a schematic representation of a circuit for detecting metering pulses according to the present invention.

The circuit shown in FIG. 3 is based on developing the concepts described above. In said figure, the signal Xda(t) is broken down by analysis into two signals, Xfa(t) and Xqa(t), which are the in-phase and quadrature components of the signal Xda(t) with the same spectrum as Xda(t), in order to carry out an amplitude detection of the input signal, Xe(t), independently of its phase.

The implementation of the multiplication between the signals Xfa(t) and Xqa(t), and the signal Xe(t), can be done at analogue level by using conventional analogue multipliers, or preferably, at a mixed digital level.

For example, consider a conventional analogue switch that, controlled by a digital signal, opens or closes the path for the analogue signal. This, in the time domain, is the multiplication, at any given moment, of the analogue signal Xe(t) by a digital signal Xd(t) that can only adopt two values: zero or one.

In this way, the starting point is the analogue signals Xfa(t) and Xqa(t), which can be generated mathematically in a computer, said signals being expressed as a series of real numbers, and that are converted into one-bit, digital signals by over-sampling, for example, with a sigma-delta converter working, for example, at 8 MHz, whereby the binary signals Xfd(t) and Xqd(t) produced, which at any given moment have the value 0 or 1, have the same spectra as the original analogue signals Xfa and Xqa. These digital signals Xfd(t) and Xqd(t) are applied to switches S1 and S2, of the CMOS type for example, which are capable of performing the desired multiplication, instant by instant, of the incoming analogue signal that comes from the subscriber line by the signals Xfd(t) and Xqd(t).

Next, the signals Cf(t) and Cq(t) are obtained by means of R-C integrators with cutt-off frequencies of around 1–10 Hz, followed by an analogue to digital (A/D) conversion process and the squaring process to obtain $(Cf)^2$ and $(Cq)^2$. Then, these latter parameters are added and applied to a measuring unit (UM) that measures the power received and compares it with a previously specified threshold value. If the power received is greater than said threshold value, it is assumed that a valid pulse has been detected.

Figure 4:
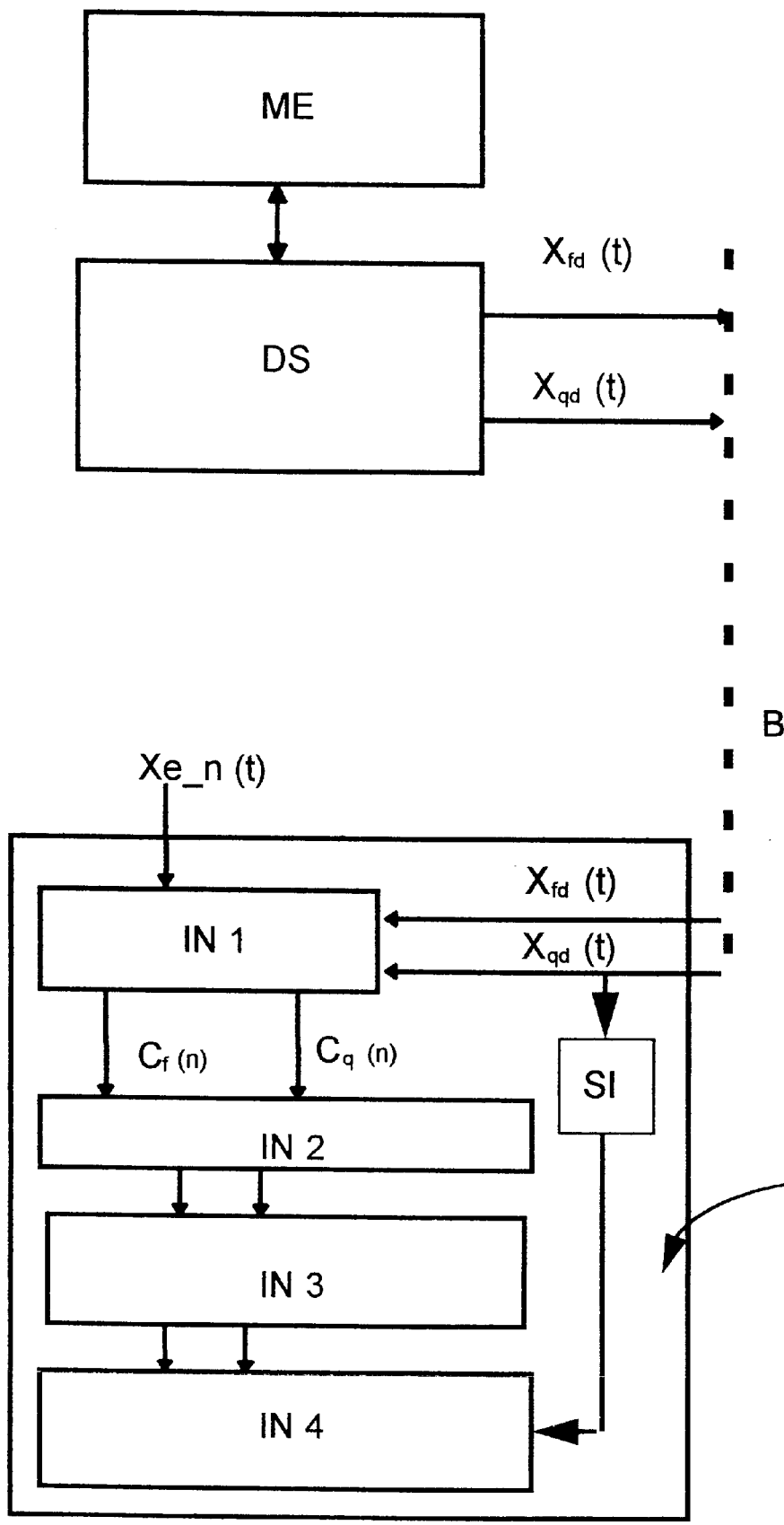
FIG. 4 is a schematic representation of the structure formed by the main elements of the system of the invention, already located in an access system, on its exchange side.

Finally, the configuration of the main elements of the system that permits the complete detection to be carried out can be seen in FIG. 4.

Said configuration comprises an EPROM, shown in the figure with the reference ME, which holds the specifications of the binary digital signals Xfd(t) and Xqd(t) for each country and supplies them to the access system in use through a distribution system DS of the digital signals Xfd(t) and Xqd(t), via the back-planes BP of the access system, from the exchange side to all two-wire interfaces; and an interface module, IN, located on the exchange side with numerous subscribers.

The interface module IN, for its part, comprises for each subscriber a mixed digital-analogue modulation block IN1, which receives the analogue signal Xe-n(t) from a subscriber line "n" that corresponds to said modulator, and multiplies it with the digital signals Xfd(t) and Xqd(t) that it receives from the distribution system DS, via said back-plane. The resulting signals, Cf(t) and Cq(t), are multiplexed by a subscriber multiplex IN2, and are converted from analogue to digital in a converter IN3.

The task of obtaining, in a defined period, samples of Cf and Cq, square them and add them to obtain the power spectral density of the mask for the input signal frequency, is performed by a digital signal processor IN4, which can be adapted to provide service for a large number of subscribers, for example around 128 with an 8-bit microprocessor, or around 10,000 with a standard digital signal processor (DSP) like the C50 model of Texas Instruments.

The power spectral density so obtained is measured, as already mentioned with respect to FIG. 3, in a measuring unit UM, in which takes place the detection of the pulse frequency in the received signal Xe.

Optionally, use can be made of a synchronisation block SI (see FIG. 4), of the acquisition process of signals Cf(t) and Cq(t) with the signals Xfd(t) and Xqd(t), for the purpose of optimising the power acquired in the signals Cf(t) and Cq(t).

As can be seen, the system does not include any setting process since the accuracy in the detected spectrum is achieved thanks to the digital signals Xfd and Xqd, the output rate of which can have the precision of a quartz crystal in the central unit. Moreover, the hardware required per subscriber is minimal: two CMOS analogue switches, S1 and S2 for example, followed by two R-C cells with cut-off frequency of around 1 Hz.

The digital signal processing per subscriber is likewise minimal, a standard 8-bit microprocessor, for example the 68HC11 from Motorola, can convert analogue signals to digital signals and provide processing for up to 128 channels. Similarly, the change from one detection mask to another is done in a single module for the whole system by changing a memory, for example an EPROM, in which the binary signals Xfd and Xqd are located, a change which could even be done in remote mode, for example by remote loading.

What is claimed is:

1. A system for detecting, in a received signal in a communications network, pulse signals having a given frequency pertaining to a particular frequency band and having a pulse duration and no carrier phase reversals within each pulse duration, said system comprising a signal generator for generating at least one specific signal having a spectrum corresponding to said particular frequency band; a multiplier multiplying said received signal by said at least one specific signal; and a power measurement component measuring power levels corresponding to the signals resulting from the multiplication, such that a measured power having a value greater than a predefined threshold value is indicative of detection of the given frequency.

2. A system according to claim 1, wherein the specific signal is broken down by analysis into two signals which are analytical in-phase and quadrature components of the specific signal and having the same spectrum as the specific signal, for the purpose of carrying out an amplitude detection of the incoming signal independently of its phase.

3. A system according to claim 1, wherein said signal generator comprises a digital unit for signal spectrum encoding capable of generating digital signals.

4. A system according to claim 3, wherein said digital signals contain spectral specifications of the network to which the subscriber is connected, in the form of digital encoding of a mask for detection and rejection of frequency levels.

5. A system according to claim 1, wherein the signal resulting from said multiplication is applied to a filter, the output from which is squared for providing an estimate of the power spectral density of the specific signal, scaled in proportion to the amplitude of the received signal, so that said spectrum behaves substantially the same as a desired detection mask.

6. A system according to claim 1, wherein the multiplication is performed by switches capable of multiplying an incoming analogue signal with at least one binary digital signal having the same spectrum as the analogue signals in the frequency band of interest.

7. An access system for managing access by subscribers to a telecommunications system, said access system comprising the detection system of claim 1.

8. An access system according to claim 7, wherein the system comprises at least one specification storage device for specific signals; at least one distribution component for distributing said signals via the back-planes of the access system; and at least one subscriber interface.

9. An access system according to claim 8, wherein the interface comprises a mixed digital-analogue modulator receiving analogue signals from a subscriber line and multiplying them with digital signals received from the distribution system; a multiplexer for multiplexing signals resulting from said modulator; a converter converting analogue signals to digital signals; and a signal processor obtaining a power spectral density of a mask for the frequency of the received signal.

10. An access system according to claim 9, wherein the interface comprises a synchronisation block of an acquisition process of said resulting signals with the digital signals, for optimising the power acquired in said resulting signals.

11. A system according to claim 1, wherein said signal generator comprises a storage device storing information for generating said at least one signal with a selected one of plural frequency spectra each corresponding to a different charge for communication with a respective plurality of different locations.

12. A system for detecting at least one given frequency in a received signal in a communications network, said given frequency pertaining to a particular frequency band and said signal having a pulse duration and no carrier phase reversals within each pulse duration, said system comprising means for generating at least one specific signal, the spectrum of which corresponds to said particular frequency band; means for multiplying said received signal by said at least one specific signal; and means for measuring power levels corresponding to the signals resulting from the multiplication, such that a measured power having a value greater than a predefined threshold value is indicative of detection of the given frequency.

13. An access system for managing access by subscribers to a telecommunications system, said access system comprising the detection system of claim 12.

14. An access system according to claim 13, wherein the system comprises at least one specification storage device for specific signals; at least one distribution component for distributing said signals via the back-planes of the access system; and at least one subscriber interface.

15. A system for detecting, in a received signal in a communications network, pulse signals having a given frequency and a pulse duration and having no phase reversals within each pulse duration, said given frequency pertaining to a particular frequency band, said system comprising a signal generator for generating at least one specific signal having a spectrum corresponding to said particular frequency band; a multiplier multiplying said received signal by said at least one specific signal; and a power measurement component measuring power levels corresponding to the signals resulting from the multiplication, such that a measured power having a value greater than a predefined threshold value is indicative of detection of the given frequency, wherein said at least one specific signal incorporates a detection mask corresponding to the communications network in which said system is to be operated.

16. A system for detecting signals having a given frequency in a received signal in a communications network, said given frequency pertaining to a particular frequency band, said system comprising a signal generator for generating at least one specific signal having a spectrum corresponding to said particular frequency band; a multiplier multiplying said received signal by said at least one specific signal; and a power measurement component measuring power levels corresponding to the signals resulting from the multiplication, such that a measured power having a value greater than a predefined threshold value is indicative of detection of the given frequency, wherein said signal generator is programmable for adaptation of said at least one specific signal to different communications networks.

17. A system according to claim 16, wherein said signal generator is programmable by replacing a memory component.

18. A system according to claim 16, wherein said signal generator includes a programmable memory component which can be reprogrammed in accordance with a particular communications network in which said system is to operate.

19. A system according to claim 16, wherein said at least one specific signal incorporates a detection mask corresponding to the communications network in which said system is to be operated.

\* \* \* \* \*